(12) United States Patent
Kusunoki

(10) Patent No.: US 6,508,590 B2
(45) Date of Patent: Jan. 21, 2003

(54) EXTERNALLY PRESSURIZED GAS BEARING SPINDLE

(75) Inventor: Kiyotaka Kusunoki, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/799,718

(22) Filed: Mar. 7, 2001

(65) Prior Publication Data

US 2001/0021283 A1 Sep. 13, 2001

(30) Foreign Application Priority Data

Mar. 10, 2000 (JP) ........................................ 2000-067231

(51) Int. Cl.[7] ............................................... F16C 32/06
(52) U.S. Cl. ........................ 384/111; 384/107; 384/114
(58) Field of Search ................................ 384/100, 107, 384/113, 111, 114

(56) References Cited

U.S. PATENT DOCUMENTS

| | | | | | |
|---|---|---|---|---|---|
| 3,617,102 A | * | 11/1971 | Wada et al. | ................. | 384/107 |
| 3,685,874 A | * | 8/1972 | Gerard | ........................ | 384/114 |
| 3,698,774 A | * | 10/1972 | Saulgeot et al. | ............. | 384/107 |
| 3,785,708 A | * | 1/1974 | Miyasaki | ..................... | 384/111 |
| 4,613,288 A | * | 9/1986 | McInerney | .................. | 384/107 |
| 4,869,601 A | * | 9/1989 | Scott | .......................... | 384/100 |
| 5,274,286 A | * | 12/1993 | Yamamura | .................. | 310/262 |
| 5,553,948 A | * | 9/1996 | Ito | ............................. | 384/100 |
| 5,707,154 A | * | 1/1998 | Ichiyama | ................... | 384/107 |
| 6,019,515 A | * | 2/2000 | Fujii et al. | .................. | 384/107 |
| 6,071,013 A | * | 6/2000 | Inaguma et al. | ........... | 384/100 |
| 2001/0016090 A1 | * | 8/2001 | Takanashi et al. | .......... | 384/100 |

FOREIGN PATENT DOCUMENTS

| GB | 2235259 | * | 2/1991 | ................ | 384/114 |
|---|---|---|---|---|---|
| GB | 2246176 | * | 1/1992 | ................ | 384/114 |

* cited by examiner

Primary Examiner—Christopher P. Schwartz
Assistant Examiner—Devon Kramer
(74) Attorney, Agent, or Firm—Wenderoth, Lind & Ponack, L.L.P.

(57) ABSTRACT

An air spindle is provided which allows high-speed operation without reducing the bearing stiffness in the air spindle by reducing the heat generation at bearing portions. By increasing the number of nozzles for the radial bearing or increasing the axial distance between the nozzles, the ratio of the supply air flow rate Q to the bearing stiffness H is set at 2–10 to release heat generation at the bearing portions to outside by the gas.

2 Claims, 4 Drawing Sheets

EXTERNALLY PRESSURIZED GAS BEARING SPINDLE

BACKGROUND OF THE INVENTION

This invention relates to an externally pressurized gas bearing spindle and particularly to a bearing spindle suitable for high-speed rotation.

FIG. 1 shows an externally pressurized gas bearing spindle (hereinafter referred to as an air spindle). This air spindle has bearing sleeves 2, 2' mounted in a housing 1. A motor bracket 4 is joined to the rear end of the housing 1. A main shaft 5 is inserted into the bearing sleeves 2, 2'. A small-diameter portion at the rear end of the main shaft 5 is coupled to a rotor 6 of a motor 3 in the motor bracket 4. The motor 3 has its stator 7 supported by the motor bracket 4. A rotary encoder 8 is mounted on the rear end of the main shaft 5, which protrudes outwardly out of the motor bracket 4. The encoder 8 detects the number of revolutions of the main shaft 5.

At a portion near the motor 3, the main shaft 5 is provided with a thrust plate 11 in a flange-like manner. The thrust plate 11 is disposed between the bearing sleeve 2 and another bearing sleeve 2'.

A gas-supply passage 12 for radial bearing is provided so as to extend in a radial direction through the housing 1 and the bearing sleeve 2. A plurality of narrow diametric nozzles 13 are arranged annularly in four rows in an inner or radial bearing surface of the bearing sleeve 2.

The gas-supply passage 12 communicates with the four rows of nozzles 13. By supplying pressurized gas through the gas-supply passage 12, radial bearings 14, 14' for the main shaft 5 are formed at two places. Exhaust is made through an exhaust passage 15 extending radially and axially through the housing 1.

A gas-supply passage 16 for a thrust bearing is provided so as to extend through the housing 1 and the bearing sleeve 2'. A plurality of narrow axial nozzles 17 are arranged annularly in a thrust bearing surface of the bearing sleeve 2'. The gas-supply passage 16 communicates with the nozzles 17. By supplying pressurized gas through the gas-supply passage 16, a thrust bearing 18 for the thrust plate 11 of the main shaft is formed. Exhaust is made through an exhaust passage 19 extending through the bearing sleeve 2' and the motor bracket 4.

The motor bracket 4 has a cooling gas-supply passage 20 to air-cool the motor 3.

The number of the nozzles 13 of each radial bearing 14 is four to six for each row. The distance between the rows, i.e. the axial distance S between the nozzles, is set at 40–60% of the bearing width W.

For an air spindle for medium to low speed, it is required to set the bearing stiffness as high as possible and to minimize the consumption of gas supplied. In order to meet these requirements, the optimum bearing clearance is set at several micrometers.

Specifically, as shown in FIG. 4, the bearing clearance was set at 5–8 $\mu$m (see the curve for a conventional product) to maintain the bearing stiffness as high as 0.9–1.0 kgf/$\mu$m. As will be apparent from FIG. 4, since the optimum range of bearing clearance is narrow in width and if the bearing clearance gets out of the range, the bearing stiffness decreases sharply, high machining accuracy is required for the bearing portions.

Also, heretofore, the ratio of the supply gas flow rate Q (liter/min) to the bearing stiffness H was set substantially at one (see the lines for conventional products in FIGS. 2 and 3).

When the air spindle set as described above is used at high-speed rotation, the bearing friction loss increases markedly because it increases in proportion to the square of the number of revolutions. Since the load on the motor 3 also increases in proportion to the bearing friction loss, the motor current increases. Due to these factors, the temperature of the air spindle increases markedly during high-speed rotation.

When the temperature of the air spindle increases, heat is conducted to surrounding parts, causing thermal expansion, thus deteriorating the accuracy of the device. Also, if it is used in a disk examination device, if the main shaft 5 of the air spindle extends due to thermal expansion, it is possible that examination becomes impossible because the measuring range of a measuring sensor or a magnetic head cannot follow the displacement of the main shaft during examination.

Thus, conventional air spindles could be used only at a speed of 20000 r/min or under.

An object of this invention is to provide an air spindle for high-speed rotation in which heat generation is suppressed during high-speed rotation without lowering the bearing stiffness to minimize the elongation with temperature rise and influence of elongation on surrounding devices.

SUMMARY OF THE INVENTION

According to this invention, there is provided an externally pressurized gas bearing spindle comprising a housing, a bearing sleeve mounted in the housing, a main shaft supported in the bearing sleeve, a gas supply passage extending through the bearing sleeve and the housing, a plurality of narrow nozzles provided in the bearing sleeve, a radial bearing formed by supplying gas to a bearing surface between the bearing sleeve and the main shaft, the ratio of the supply gas flow rate Q to the bearing stiffness H of the radial bearing being set at 2–10.

Other features and objects of the present invention will become apparent from the following description made with reference to the accompanying drawings, in which:

DETAILED DESCRIPTION OF THE PREFERRED EMBODIMENT

In order to solve the abovesaid problem, based on the basic concept of increasing the supply gas flow rate Q while maintaining the bearing stiffness H of the air spindle at a high constant level as conventional and releasing the heat generation at the bearing portions to outside by the gas, the present inventors studied the number of nozzles, the axial nozzle distance, bearing clearances, etc.

Figure 2:
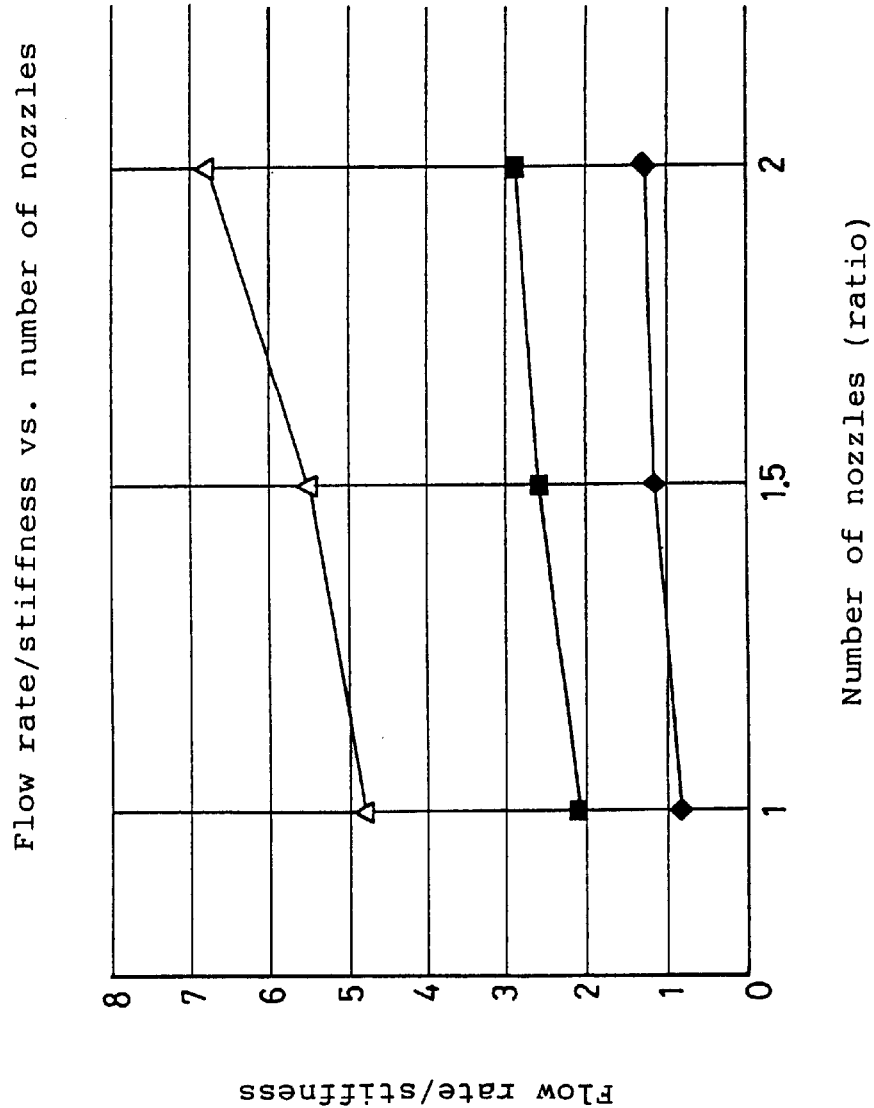
FIG. 2 is a graph showing the relation between flow rate/stiffness and the number of nozzles.

While, heretofore, the number of nozzles was 4–6 per row, according to the present invention, it has been increased to about 1.5 to 2-fold (6–12 per row). As shown in FIG. 2, for product A of the present invention (bearing clearance 9 $\mu$m) and product B of the present invention (bearing clearance 12 μm), Q/H was 2–7. That is, the supply gas flow rate has increased to 2 to 7-fold.

As described above, because the supply air flow rate Q increases compared with conventional products by increasing the number of nozzles, it is possible to increase the cooling effect without reducing the bearing stiffness. Thus, an air spindle can be provided which permits high-speed rotation and exhibits better cooling effect.

Figure 1:
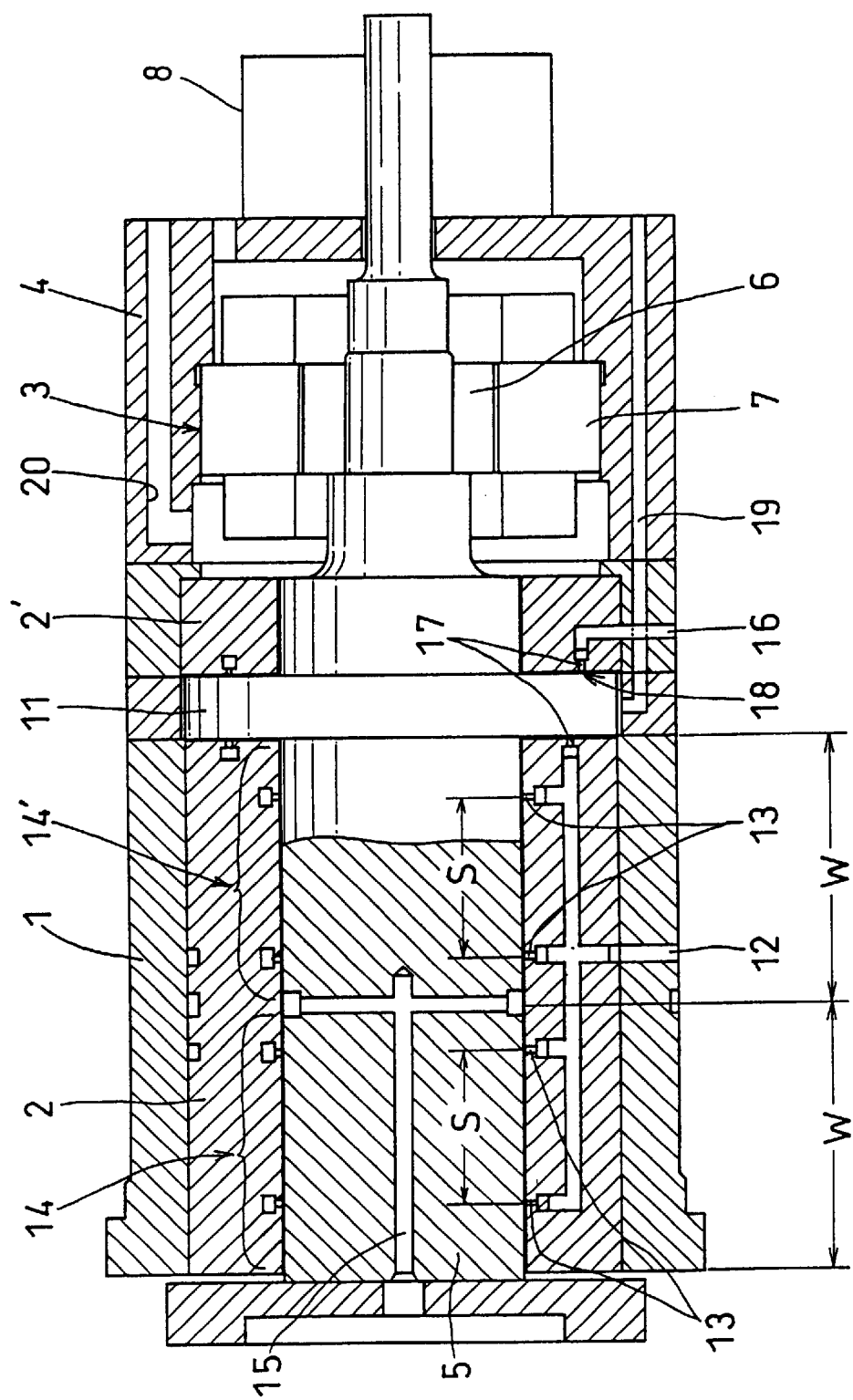
FIG. 1 is a sectional view of the bearing spindle embodying the present invention.
Figure 3:
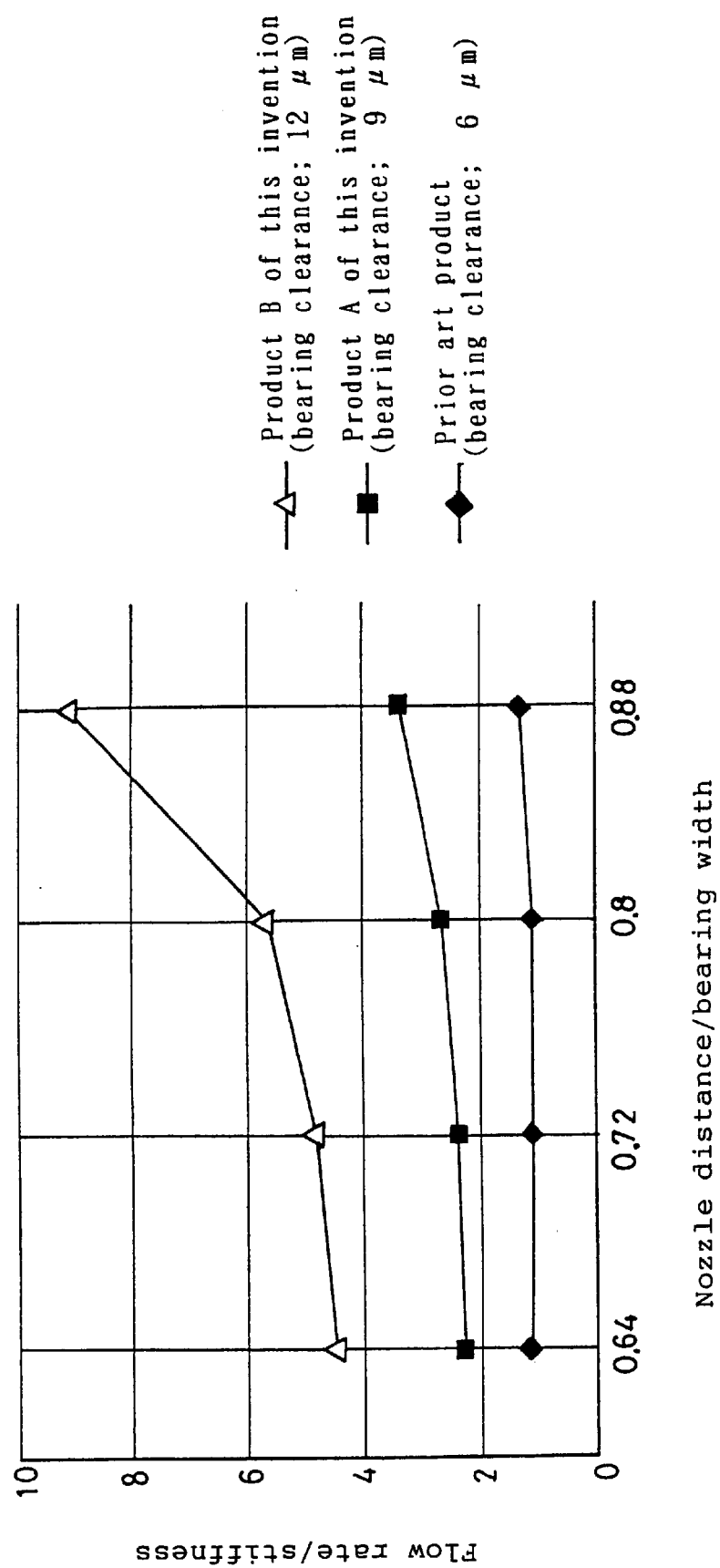
FIG. 3 is a graph showing the relation between flow rate/stiffness and the nozzle distance.

Also, while the ratio S/W of the distance S between nozzles to the bearing width W (see FIG. 1) was heretofore set at 40–60% as described above, it has been set at 70–90% according to the present invention, and the nozzles are provided near both ends. As a result, as shown in FIG. 3, for products A and B of the present invention, Q/H has increased to 2 to 10-fold, that is, the supply gas flow rate has increased to 2 to 10-fold. Since the supply gas flow rate Q relative to the bearing stiffness increases compared with conventional products, the cooling effect is improved.

Figure 4:
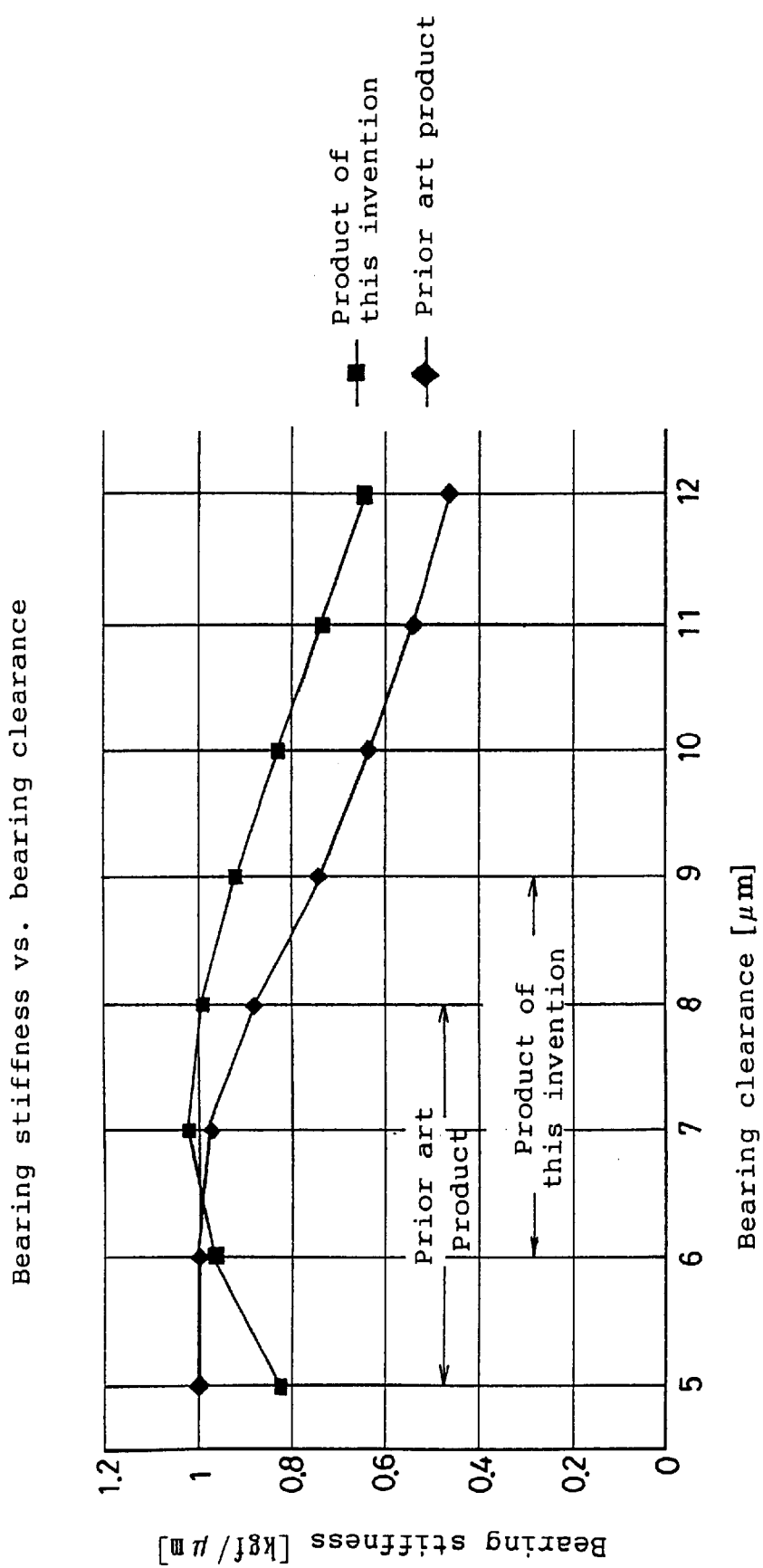
FIG. 4 is a graph showing the relation between bearing stiffness and bearing clearance.

Also, as described above, even if the bearing clearance is set at 6–9 μm, the bearing stiffness H is maintained at substantially the same level (0.9–1.0, see FIG. 4) as conventional.

With this arrangement, since it is possible to set the initial bearing clearance of the air spindle to a larger value, and set the tolerance of bearing clearance more widely, machining is easier than before. Also, by increasing the bearing clearance, the bearing friction loss decreases, the heat generation at the bearing portions decreases, and the motor load decreases. Besides, reduction in the passage loss makes it easy to discharge heat at the bearing portions out of the air spindle.

These measures are taken for the radial bearings 14. Besides them, the axial bearing clearance of the thrust bearing 18, which is large in heat generation compared with the radial bearings 14, is set at 1.5 times the bearing clearance of the radial bearings 14 (7–15 μm). The number of nozzles 17 of the thrust bearing 18 provided on both sides of the thrust plate 11 of the main shaft 5 is increased. Because the radial stiffness is prevailing for the influence on the critical speed, even if increase in the axial clearance results in decrease in the axial stiffness, the critical speed will not decrease. Thus it is possible to reduce the heat generation and discharge generated heat together with bearing air.

Thus, according to this invention, use for highspeed rotation of 30000 r/min is possible with a main shaft 5 having a diameter of 30 mm.

According to this invention, in contrast to the conventional bearing structure in which the flow rate of gas in air spindles is suppressed, by increasing the gas flow rate without reducing the bearing stiffness, it is possible to release heat generation at the bearing portions to outside by the gas and to suppress their temperature rise. Also, by reducing the friction loss of the air spindle, the load on the motor decreases, so that it is possible to reduce heat generation of the motor itself. Thus, by reducing the heat generation of the air spindle and the motor, it is possible to provide an air spindle which permits high-speed rotation and is low in temperature rise.

What is claimed is:

1. An externally-pressurized gas bearing spindle comprising:

a housing;

a bearing sleeve mounted in said housing and having a bearing surface;

a main shaft supported in said bearing sleeve;

a gas supply passage extending through said bearing sleeve and through said housing;

a plurality of radial nozzles formed in said bearing sleeve and communicating with said gas supply passage so as to form a radial bearing by supplying gas to a bearing clearance area between said bearing surface of said bearing sleeve and said main shaft, said bearing clearance area having a radial width in a range of 6 μm to 9 μm, said radial nozzles being arranged in a plurality of rows, each of said rows including a quantity of radial nozzles in a range of 6 to 12, said rows being spaced along an axial direction of said bearing sleeve in a ratio S/W having a range of 0.7 to 0.9, wherein S is an axial distance between nozzles, and W is a bearing width of said radial bearing, said radial nozzles being operable to supply gas so as to maintain a ratio Q/H in a range of 2 to 10, wherein Q is a flow rate of the supply gas, and H is a stiffness of the bearing.

2. The gas bearing spindle of claim 1, wherein said main shaft has a thrust plate, further comprising a plurality of axial nozzles formed in said bearing sleeve and communicating with said gas supply passage so as to form a thrust bearing by supplying gas to a thrust bearing clearance area between said thrust plate and said bearing surface of said bearing sleeve, said thrust bearing clearance area having an axial width in a range of 7 μm to 15 μm.

* * * * *